United States Patent [19]
Byerly

[11] Patent Number: 5,597,359
[45] Date of Patent: Jan. 28, 1997

[54] AUDIENCE MOTION PLATFORM

[75] Inventor: David C. Byerly, Brackney, Pa.

[73] Assignee: Doron Precision Systems, Inc., Binghamton, N.Y.

[21] Appl. No.: 548,880

[22] Filed: Oct. 26, 1995

[51] Int. Cl.⁶ .................................................. A63G 31/16
[52] U.S. Cl. ................. 472/60; 472/130; 434/55
[58] Field of Search ................... 472/59, 60, 130, 472/136; 434/30, 55, 34, 58, 29

[56] References Cited

U.S. PATENT DOCUMENTS

| | | | |
|---|---|---|---|
| 3,619,911 | 11/1971 | Pancoe | 434/58 |
| 4,753,569 | 6/1988 | Hart et al. | 434/29 |
| 4,874,162 | 10/1989 | Trumbull et al. | 472/60 |
| 5,009,412 | 4/1991 | Roodenburg et al. | 472/59 |
| 5,366,375 | 11/1994 | Sarnicola | 434/29 X |
| 5,513,990 | 5/1996 | Gluck | 434/29 X |

*Primary Examiner*—Kien T. Nguyen
*Attorney, Agent, or Firm*—Richard G. Stephens

[57] ABSTRACT

A motion platform system for tilting and moving an audience of seated people as they view scenes projected on a screen includes four hydraulic cylinders arranged not only to pitch, roll, and heave (vertically translate) the audience, but also to provide longitudinal acceleration and deceleration forces.

2 Claims, 12 Drawing Sheets

AUDIENCE MOTION PLATFORM

This invention relates to motion platforms of the type used in connection with motion picture projection to move (i.e., tilt, lift and lower, etc.) audiences as they simultaneously view projected scenes, usually mainly for entertainment purposes, though some such activity also provides some education.

BACKGROUND OF THE INVENTION

The broad idea of moving a simulated submarine control station to simulate submarine motion as one or more submarine trainees operate dummy submarine controls and view dummy instruments dates from World War I. A variety of later devices for moving one or more trainees, or, less frequently, an audience of appreciable size, have been developed. During and since World War II, a large variety of aircraft and spacecraft training devices were developed in which one or more trainees were subjected to various tilting and translational forces as they viewed some type of projected scene simulating travel. The immense cost of various aircraft and spacecraft readily justified immense expenditures directed toward providing as much realism as could be provided, at whatever the cost. However, such cost justification does not attend mere amusement purposes, and hence amusement devices have had to use much less realistic motion simulation, even though it has been well known that added realism adds much to audience enjoyment in entertainment simulators. One important object of the invention is to provide a simulator motion system having improved realism at a relatively modest expenditure. Many motion systems of the prior art are believed to be unduly costly because they are unduly complex, tending to over-utilize hydraulic cylinders, which, together with their hydraulic systems are quite expensive to construct and also to maintain. A more specific object of the invention is to reduce the cost of simulators by using rigid links in lieu of hydraulic cylinders to constrain system motion. Various techniques utilized in the prior art for flight simulators carrying a small passenger load, such as crew or two or three trainees, are not satisfactory for use in an entertainment simulator, where it becomes desirable to move an audience or several dozen (or more people) at one time, and a very important object of the present invention is to provide motion system apparatus suitable for use with an audiences of such a size, which may present,as an example, a payload of perhaps 10,000 lbs.

The value of most if not all audience platforms depends upon how well the system in which they are used provides a feeling of realism of movements, such as simulated vehicle travel. Some very successful prior art audience platforms which provide great realism to an audience are believed to have been very successful because the audience is small enough to be "entirely enclosed", as in an enclosure approximating the size of a small van and seating say eight persons. Persons inside such an enclosure tend to feel as if they are inside a vehicle. Movements of the enclosure, together with a motion-picture or videodisc visual display, make the persons of the audience feel as if they are moving, though they do not know how much they are moving, since they have no reference to objects outside the enclosure. A member of the audience tends to feel as if he is in a forwardly-accelerating vehicle if the enclosure is merely tilted a bit rearwardly, so that he feels pressure of the seat on his back. Being enclosed, he may have no feeling whatever that he has merely been slightly tilted. In a system accommodating an audience too large to totally enclose, persons within the audience can view surrounding structure, and hence receive cues which tend to indicate whether and how much they are moving, making it more difficult to provide as much realism to members of the audience, and tending to necessitate use of actual longitudinal acceleration and deceleration to provide adequate realism. An important object of the present invention is to provide improved audience-motion apparatus which successfully accomplishes the aforementioned desiderata.

Other objects will become apparent as the description proceeds.

These and other objects of the invention will be more fully understood from the following description of the invention, taken with reference to the following drawing.

BRIEF DESCRIPTION OF THE DRAWING

FIG. 1b is a side elevation view of the exemplary theater of FIG. 1a.

The terms "front" and "rear" are used with relation to the direction at which members of the audience usually face when seated within the seats carried on the upper platform.

DESCRIPTION OF THE PREFERRED EMBODIMENT OF THE INVENTION

Figure 1A:
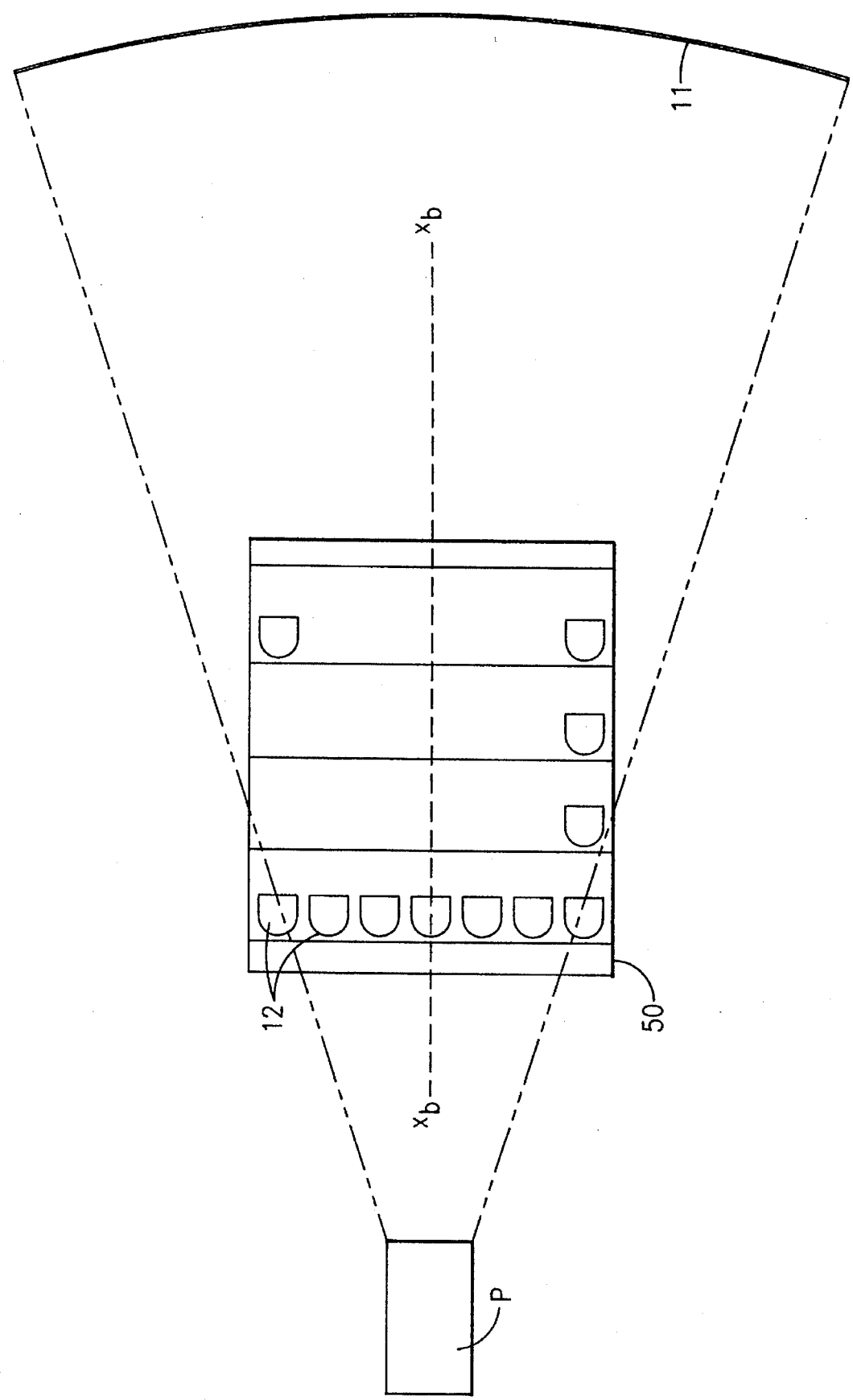
FIG. 1a is a plan view of an exemplary theater which uses the present invention, with rows of seats for an audience shown in diagrammatic form.
Figure 1B:
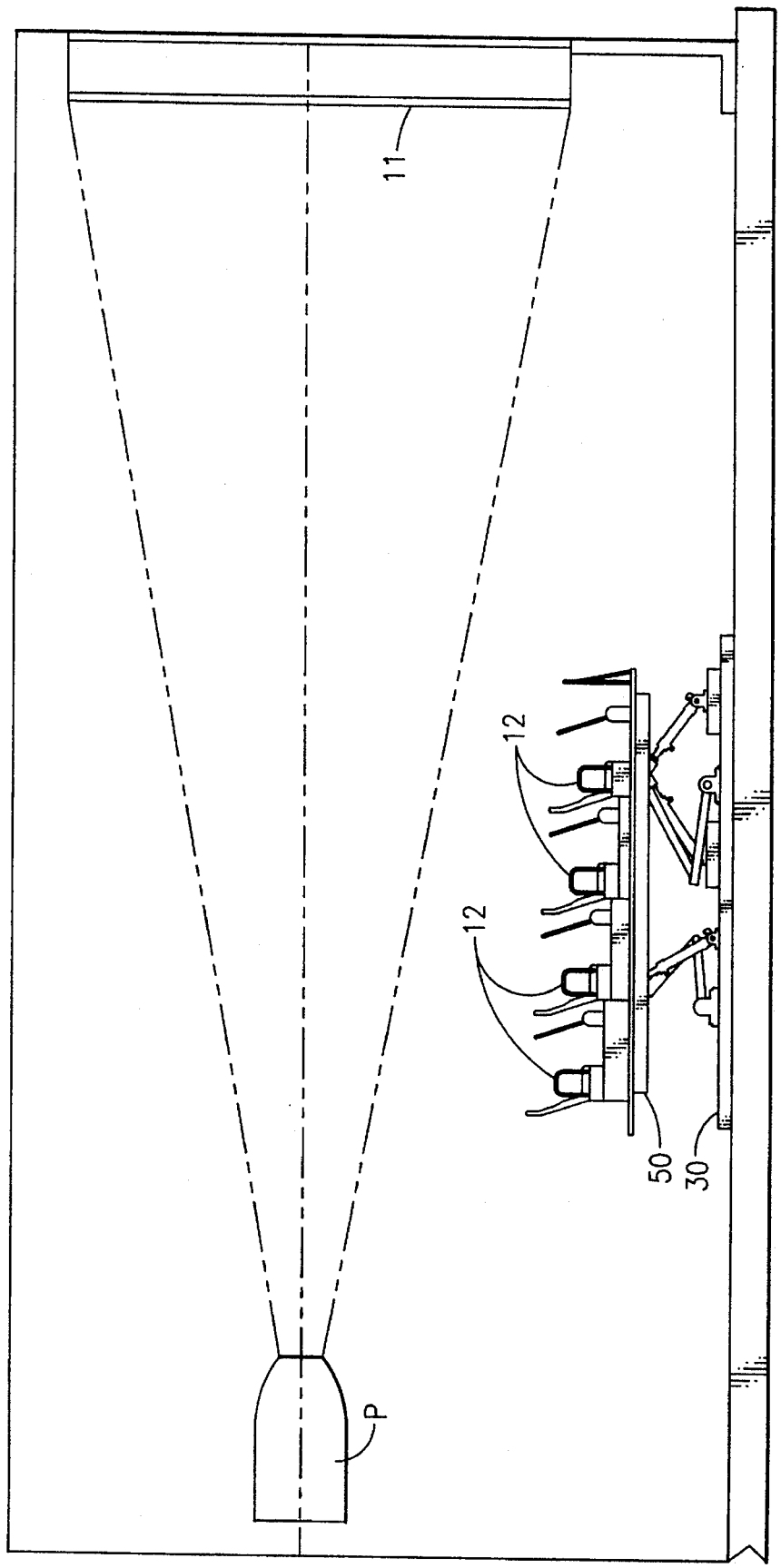

Referring first to FIGS. 1a and 1b, an exemplary theater which uses the motion system of the present invention is shown as including a stationary viewing screen 11 on which a stationary projector P projects motion pictures over the heads of an audience of viewers (not shown) facing screen 11 while seated in rows of seats 12, 12 fixedly mounted on a platform 50, as a hydraulic motion system mechanism to be described in detail causes the platform 50, the seats and the viewers to experience four types of motion. The motions may be conveniently described using terminology widely used in connection with aircraft or ship motions. The four motions include (1) a limited rotation about a generally horizontal laterally-extending axis which is ordinarily termed "pitching" in aircraft motion, (2) a limited vertical translation which is frequently termed "heave" for airplane or ship travel, (3) a limited rotation about a generally horizontally-extending longitudinal or front-to-rear axis $X_b$—$X_b$ which is commonly termed "rolling", or sometimes "banking", in ship or aircraft terminology, and (4) a limited or fore and aft "thrust" translational movement in the longitudinal direction. The pitching rotation occurs about a pitching axis which extends perpendicularly to the plane of FIG. 1b, and which may be located at any of numerous longitudinal and vertical locations in FIG. 1b. In the preferred embodiment the pitching motion extended approximately plus or minus 16° from a central level position, with a maximum velocity of approximately 23°/second. Vertical translation occurs in the upward and downward directions of FIG. 1b. In the preferred embodiment the total vertical travel was restricted to approximately 16 inches, with a maximum velocity of 12 inches per second, and a maximum vertical acceleration of about ±1.0 g (gravitational unit). Rolling motion occurred about a longitudinal axis shown at $X_b$—$X_b$ in FIG. 1a, over a ±13° range at a maximum roll velocity of 23°/second. The longitudinal movement occurred in the direction of that $X_b$—$X_b$ axis over a 20-inch range, ±10 inches from a centered position, with a maximum velocity of 14 inches per second, and a maximum acceleration of approximately 1.1 g. The motions notably omit any "yaw" or "heading" accelerations about a vertical axis, and also omit any horizontal sidewise motions.

In the mentioned preferred embodiment of the invention platform 50 carries four rows of seats having seven seats per row, and the distance between the lens of projector P and screen 11 might be 36 feet or more, with a curved screen about 24 feet wide and 14 feet high. The added horizontal x, or translational motion, not used in prior equipment, is very desirable because it allows one to realistically simulate accelerations and decelerations of a variety of vehicles.

Referring to FIGS. 2, 2a–2c and 3–5, the mechanism of the invention will be seen to comprise a base frame 30 on which an upper frame or motion platform 50 is mounted to pitch, bank and experience horizontal and vertical translation. The audience seats 12, 12 shown in FIGS. 1a and 1b have been omitted from the other Figures for drawing convenience and so as not to obscure the invention with unnecessary detail. The base frame assembly 30 is shown as comprising left and right side members 31, 32 (See FIG. 4) intermediate longitudinal members 31', 31", 32', (See FIG. 5) and front and rear members 33, 34, (FIG. 5) all of which are shown as comprising rigid, hollow steel box-section members welded to form a rectangular frame. The base frame 30 is also shown provided with seven laterally-extending stiffeners 36a to 36f, (FIG. 2) which also comprise box-section members. The base frame 30 is shown supported above the floor on six short adjustable legs 35, 35 which allow that frame to mounted horizontally with the weight properly distributed even if the floor upon which it is mounted is not perfectly even. In the preferred embodiment, the base frame was approximately 146 in. long and 80 in. wide. The fixed horizontally-extending $X_b$—$X_B$ axis (FIGS. 1a and 5) drawn midway between side members 31, 32 defines a longitudinal base axis, or $x_b$—$x_b$ axis. The horizontal direction perpendicular to that axis will be termed the y direction, in accordance with typical aircraft terminology.

It should be noted at this point that it is not at all necessary from a theoretical standpoint to provide a base frame of the nature of that shown at 30; instead, some or all of the mechanisms used to translate and rotate the upper frame carrying the audience could be merely fixedly mounted on a suitable floor, and even anchored in concrete, for example. However, it tends to be difficult to properly assemble such apparatus away from a factory having experienced technicians, and use of a frame such as that shown at 30 advantageously allows the entire motion system to be assembled and operated at a factory.

The upper frame, or motion frame, 50 is shown (See FIGS. 2 and 5) as comprising left and right side members 51, 52 and front and rear members 53, 54 all of which are shown as comprising rigid hollow steel box-section members welded to form a rectangular frame. Frame 50 is shown provided with four heavy laterally-extending stiffeners 55a–55d, and two longitudinally-extending stiffener members, 56a and 56b. In the preferred embodiment the motion frame was approximately 134 in. long and 88 in. wide.

Figure 2:
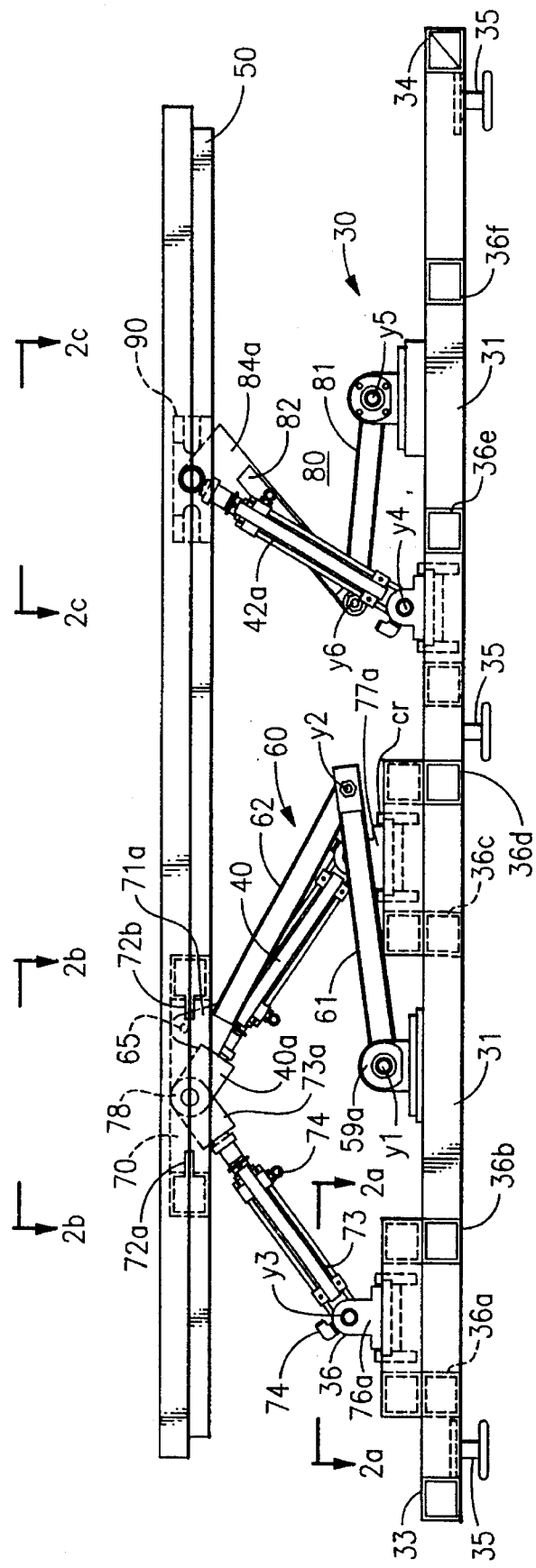
FIG. 2 is an elevation view of the motion system apparatus taken at lines 2—2 FIG. 1a, with the audience seats omitted for sake of illustration.
Figure 2A:
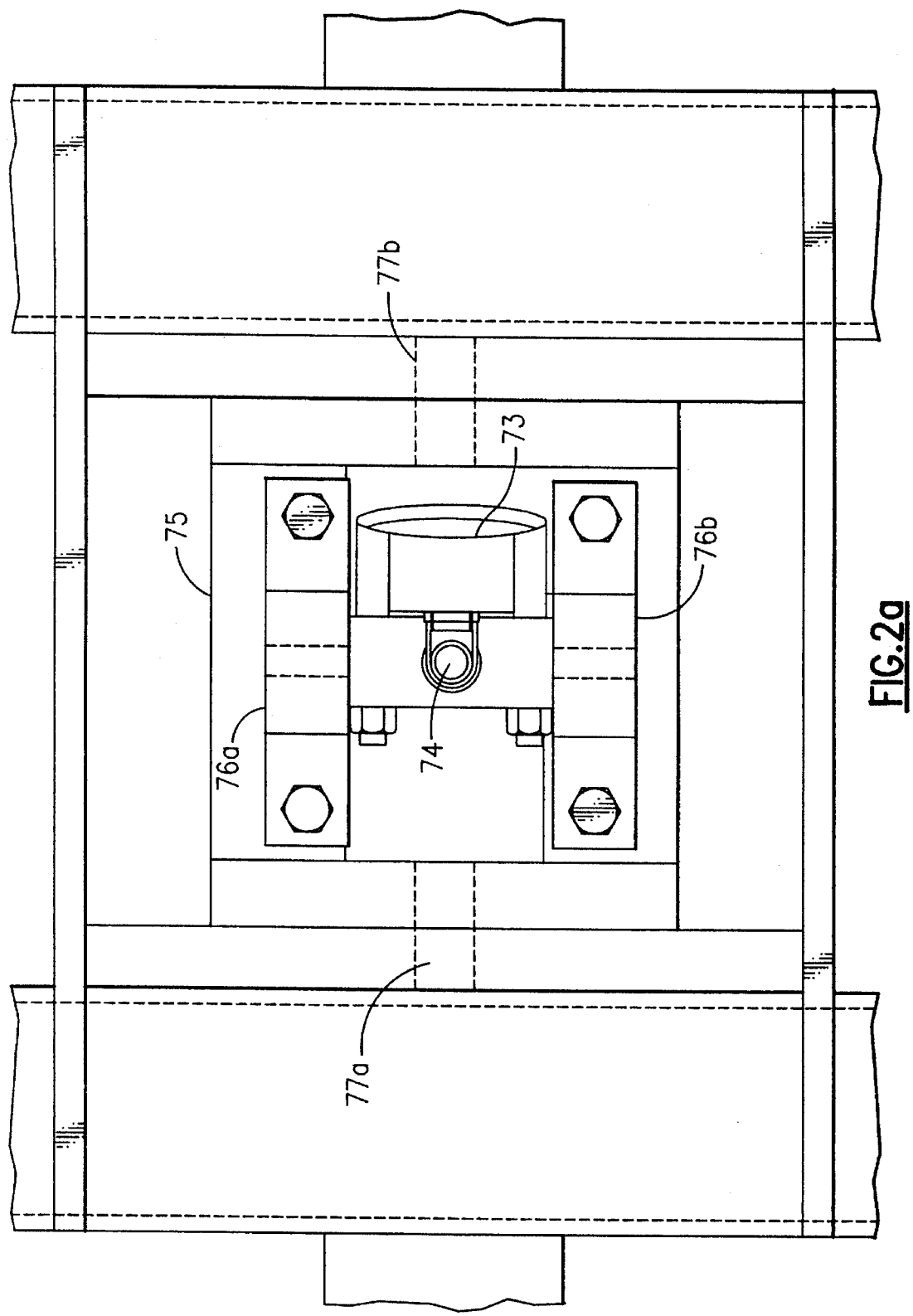
FIG. 2a is a partial section view taken downwardly at lines 2a—2a in FIG. 2.
Figure 4:
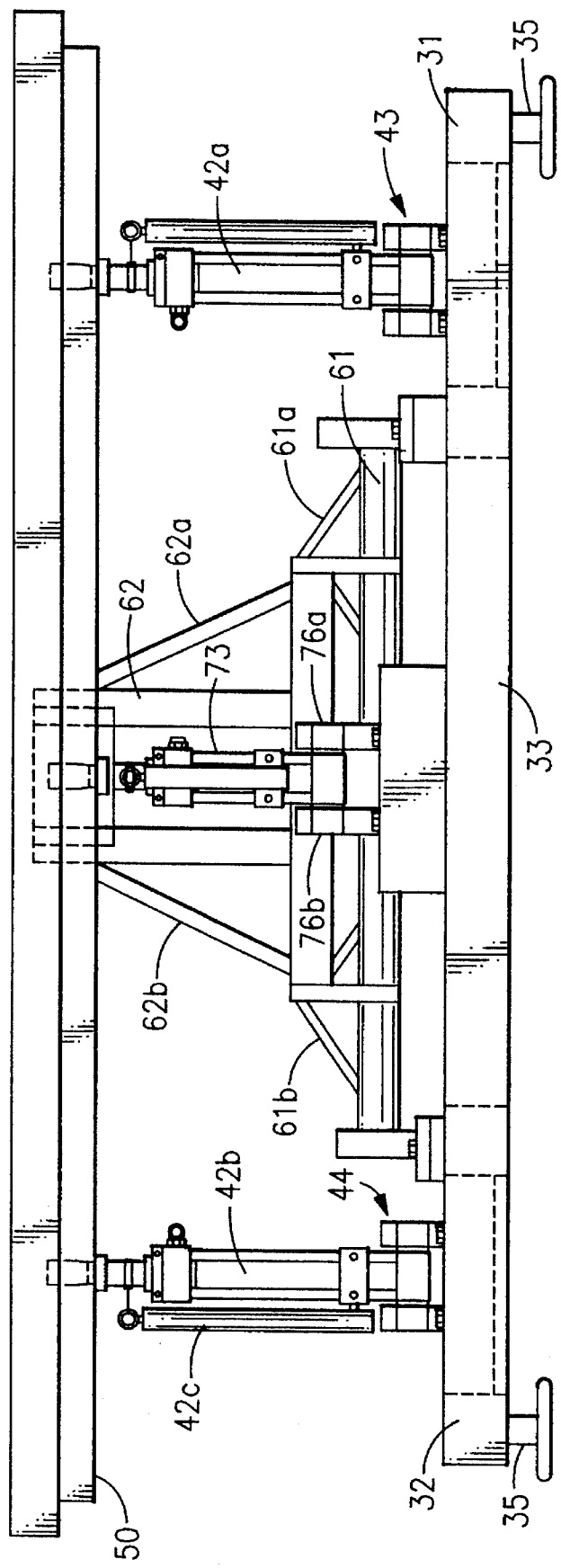
FIG. 4 is a front elevation view taken at lines 4—4 in FIG. 2.
Figure 5:
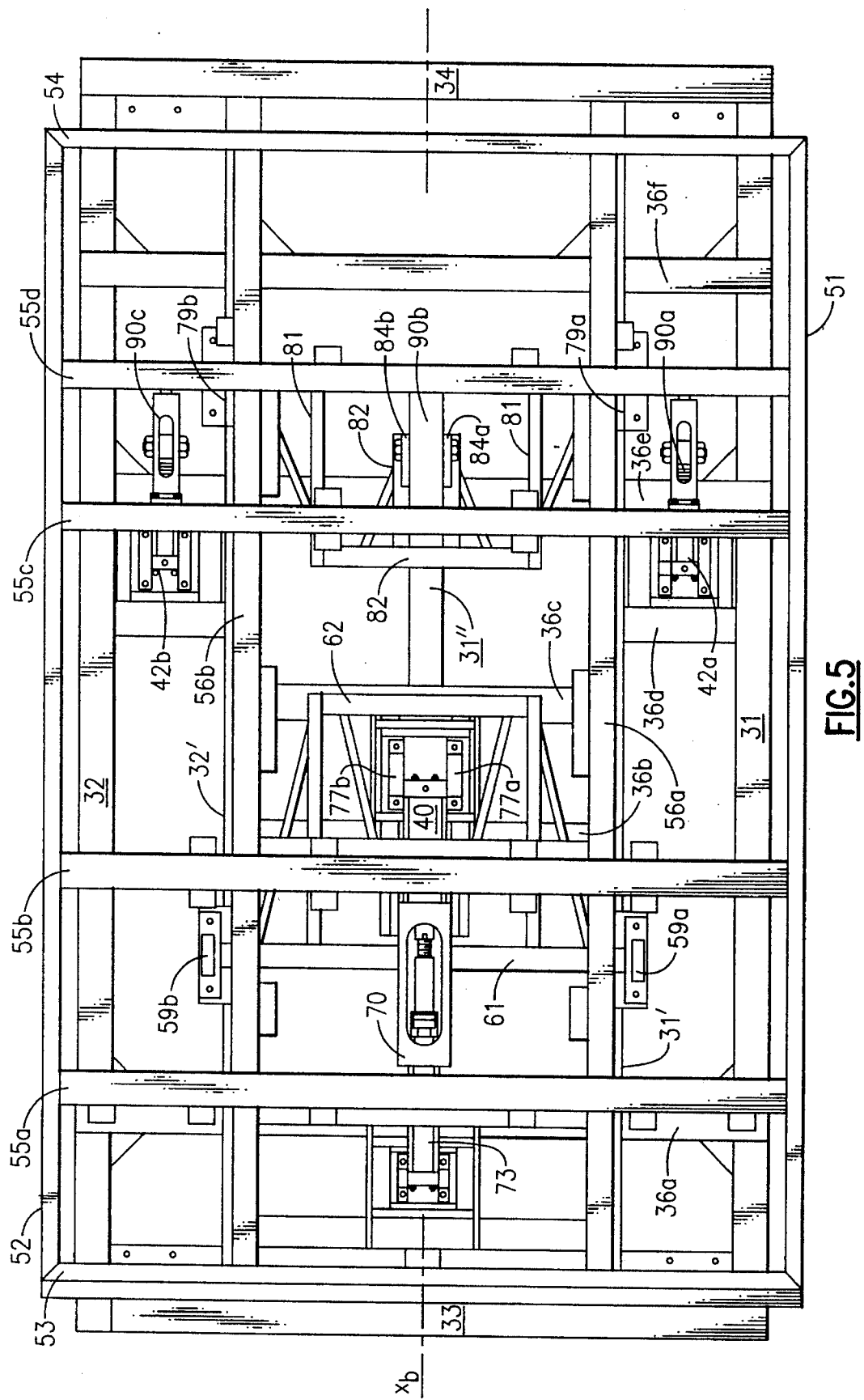
FIG. 5 is a plan view taken at line 5—5 in FIG. 2.
Figure 6:
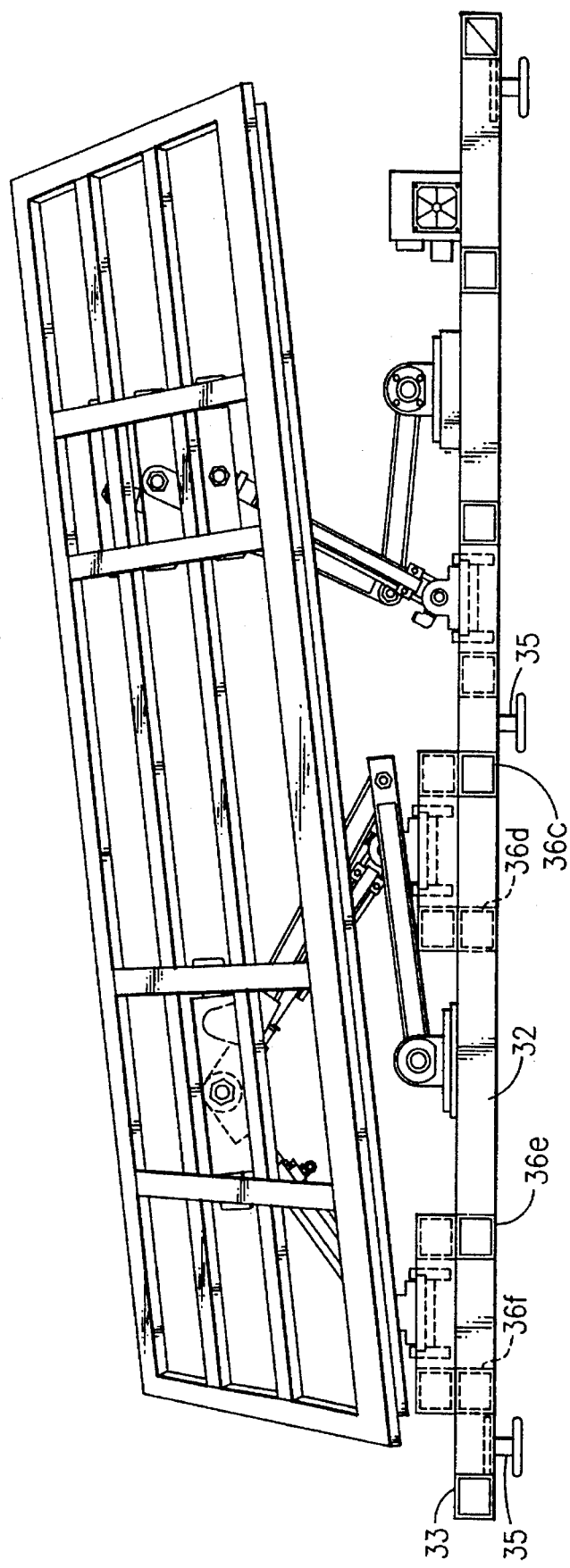
FIG. 6 is a left-side elevation view generally similar to FIG. 2 but with the motion platform moved through exemplary roll and pitch angles. Audience seats are not shown in order to afford a clear view of the mechanism. If shown in FIG. 6, each member would be facing generally leftwardly as viewed in FIG. 6, with his or her forward-view direction pitched somewhat downwardly from a horizontal direction, and with each member rolled somewhat down on his or her left side.
Figure 7:
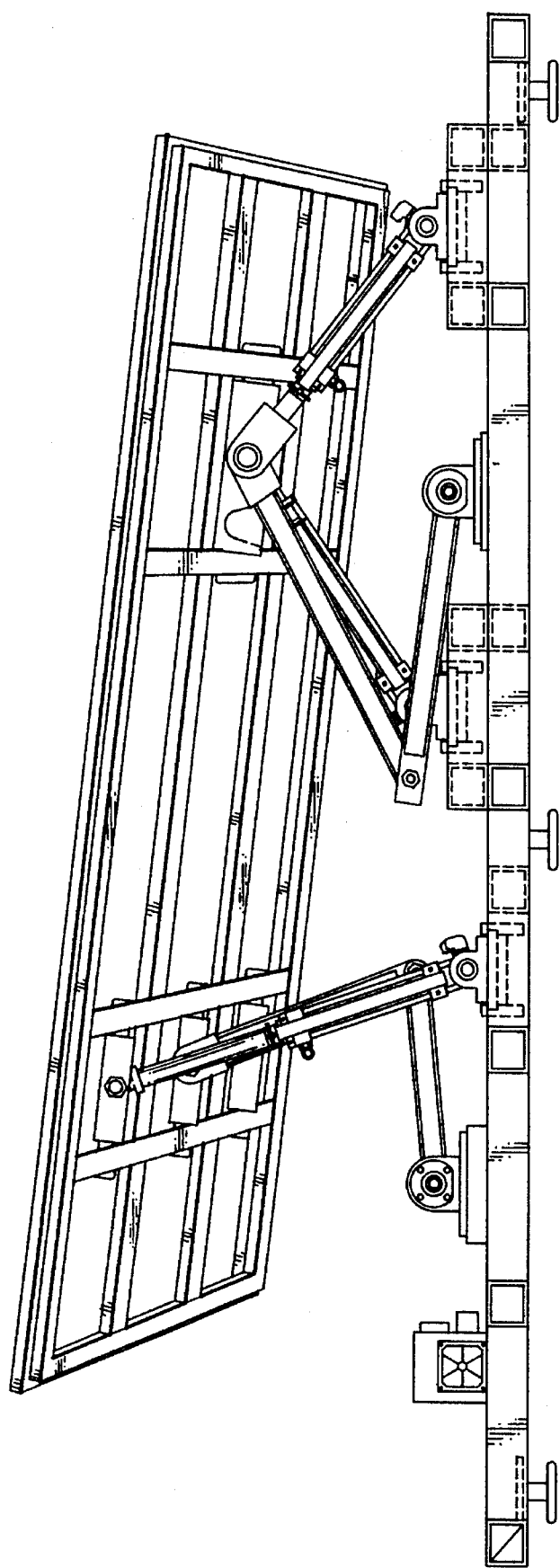
FIG. 7 is an elevation view similar to FIG. 6 but shown from the right, or opposite, side.
Figure 10:
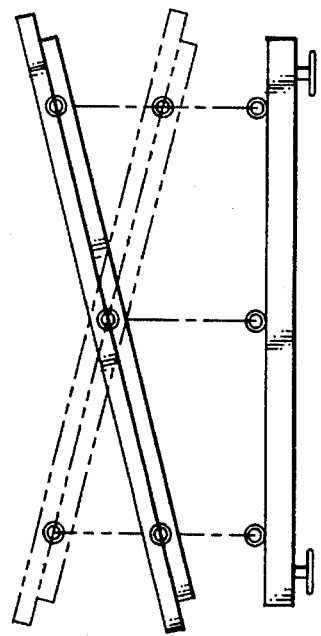
FIG. 10 is an elevational diagram showing the motion platform at minimum and maximum roll positions at an exemplary intermediate vertical or heave position.
Figure 8:
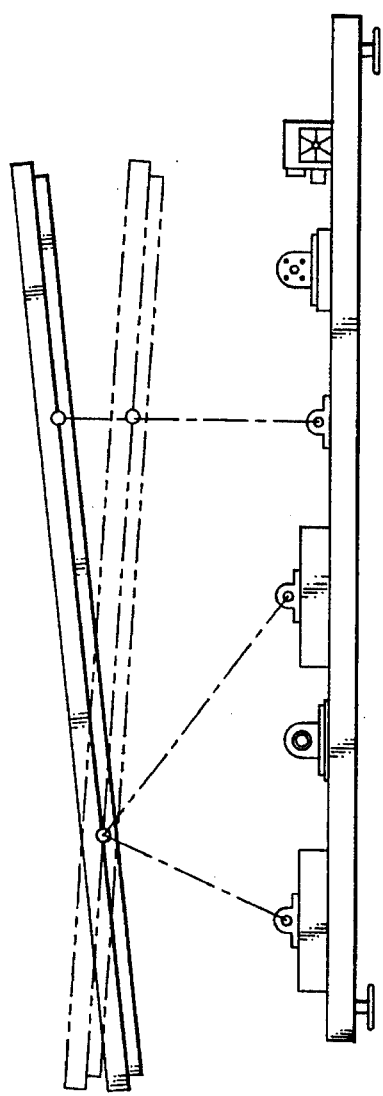
FIG. 8 is a left-side elevation diagram showing the motion platform in solid lines at a forwardmost position at the maximum pitch angle obtainable with that forward position, and in dashed lines at the minimum pitch angle obtainable at that forwardmost position, useful in understanding movements of which the motion platform is capable.
Figure 9:
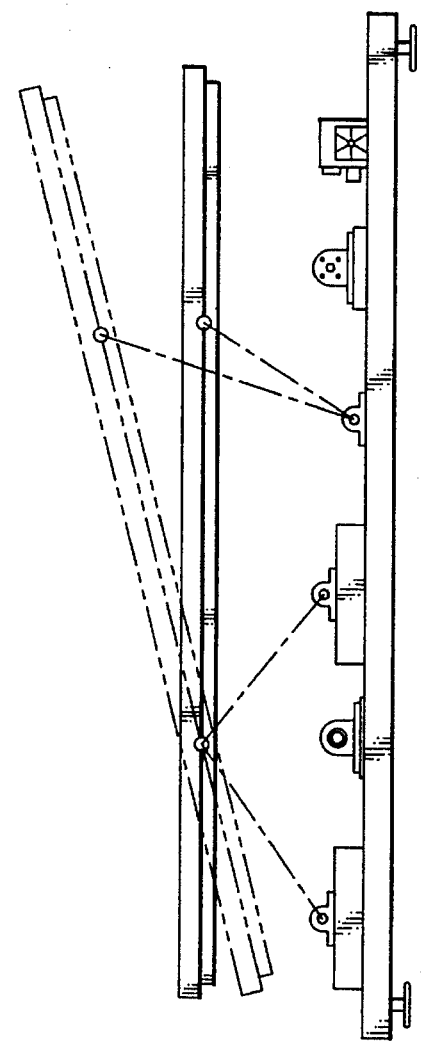
FIG. 9 is an elevational diagram showing the motion platform at a minimum heave or lowest position, in solid lines at a minimum pitch position, and in dashed lines at a fully pitched forward position.

As best seen in FIGS. 2 and 5, a rigid generally trapezoidal-shaped front hinge assembly 60 (FIG. 2) includes laterally and horizontally-extending lower and upper frames 61 and 62, both of which have substantial lateral width, as shown in FIG. 4, wherein lower frame 61 has side support members 61a and 61b, and upper frame 62 has side support members 62a and 62b. Lower frame 61 is fixedly journalled on base frame 30 to be capable of rotating about a fixed laterally-extending axis y1 defined by pillow block bearings 59a, 59b(FIG. 5), thereby allowing the lower end of upper frame member 62 to swing in an arc about the axis y1, which extends perpendicularly to the plane of FIG. 2. The rigid generally trapezoidal-shaped front upper arm 62 is hinged at its lower end, on laterally-extending axis $Y_2$, to pivot relative to lower frame 61, with axis $Y_1$ parallel to axis $Y_2$. The upper edge of upper frame 62 terminates in a pair of clevis arms or brackets 71a, 71b (FIG. 2b) which pivotally support a front roll-rotation or gimbal block 70 by means of a laterally-extending pin (shaft) 65. Block 70 is attached to members 55a, 55b of upper platform 50 by means of shafts 72a, 72b.

With hinged frame portions 61 and 62 and pin 65 all extending horizontally and laterally, it will be apparent that movement of members 61 and 62 allow front rotation (gimbal)block 70 to raise and lower relative to base frame 30, with gimbal block 70 free to translate longitudinally. Importantly, frames 61 and 62 have substantial lateral width, so that they prevent any lateral movement of block 70 and hence upper frame 50.

Figure 2B:
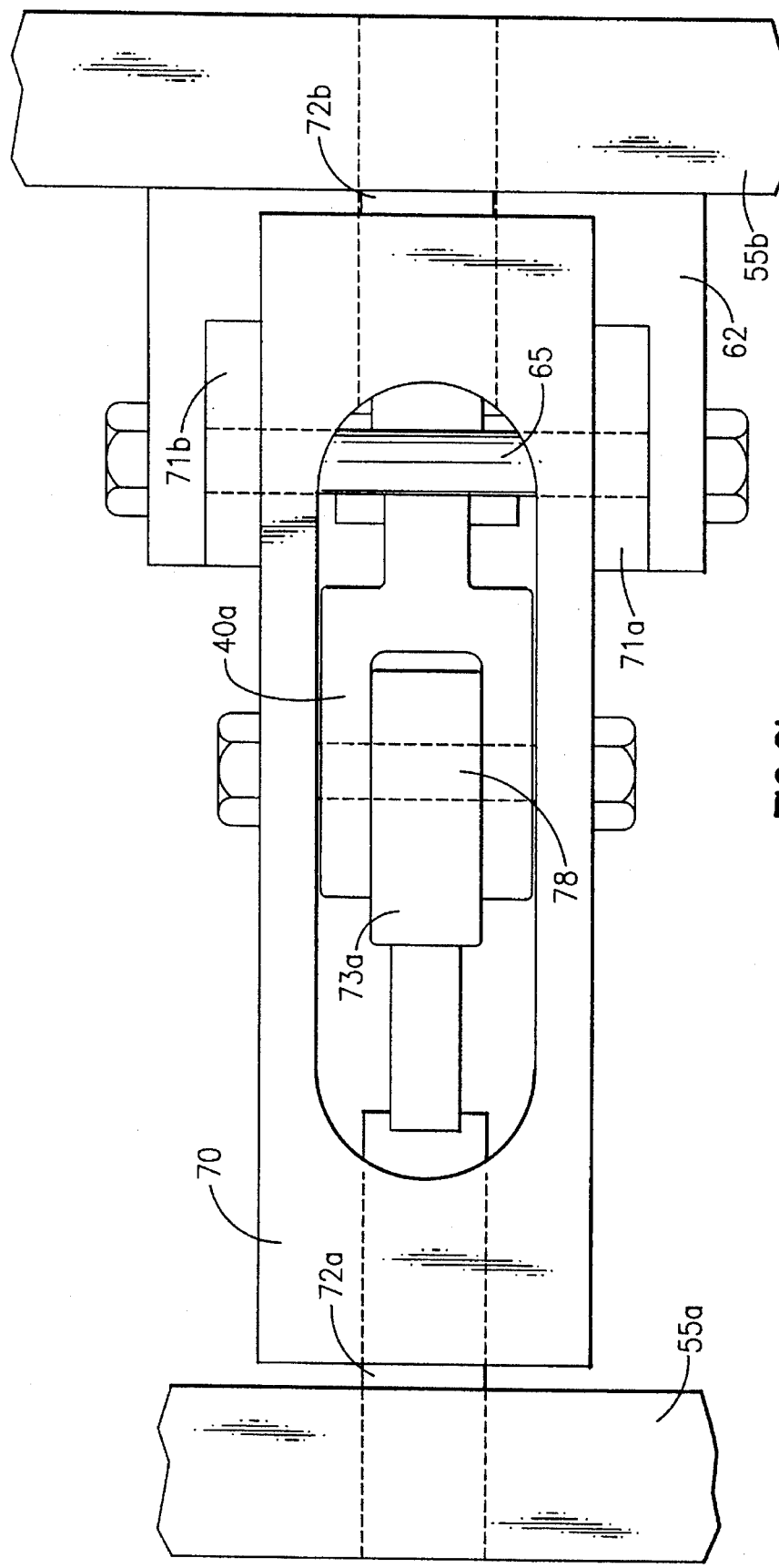
FIG. 2b is a partial section view taken downwardly at lines 2b—2b in FIG.2.
Figure 2C:
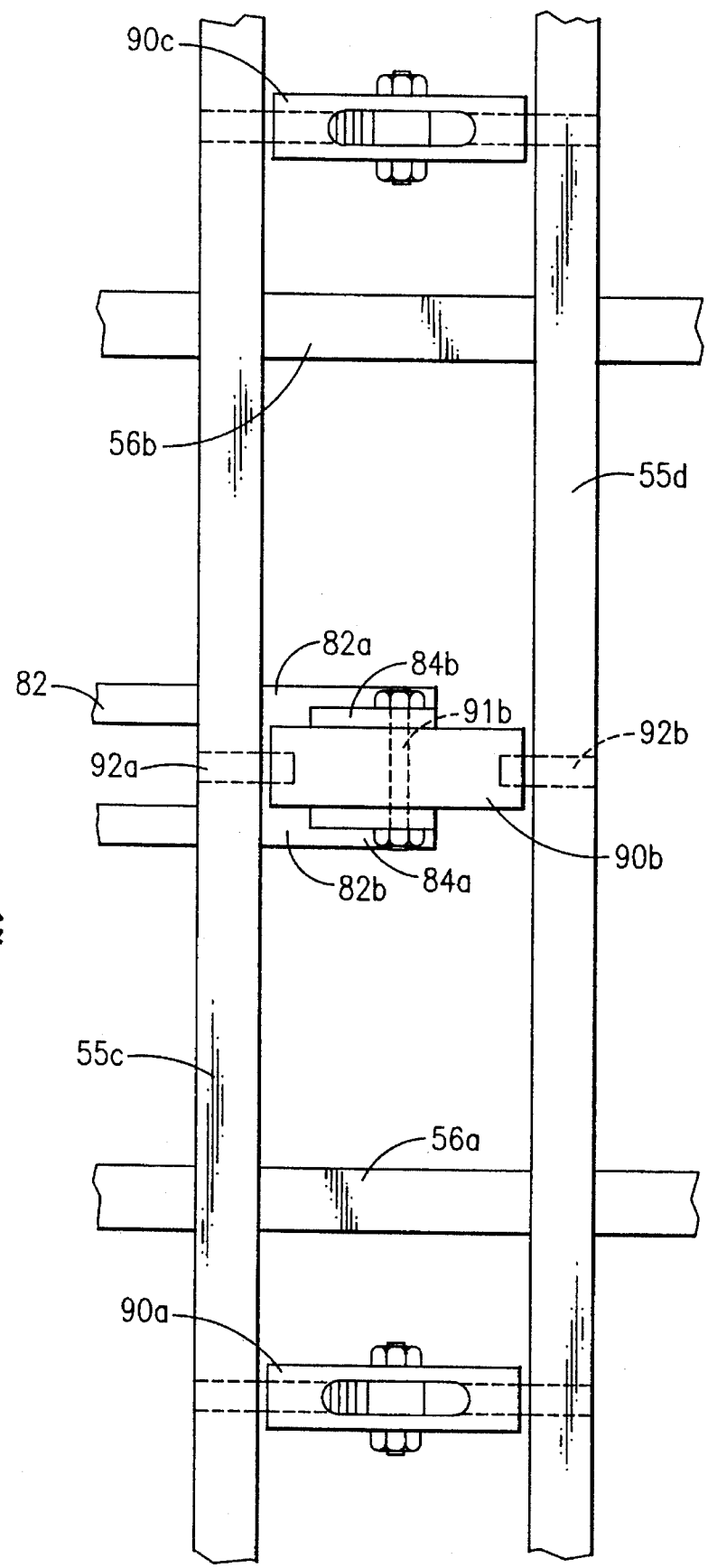
FIG. 2c is a partial section view taken downwardly at lines 2c—2c in FIG. 2.
Figure 3:
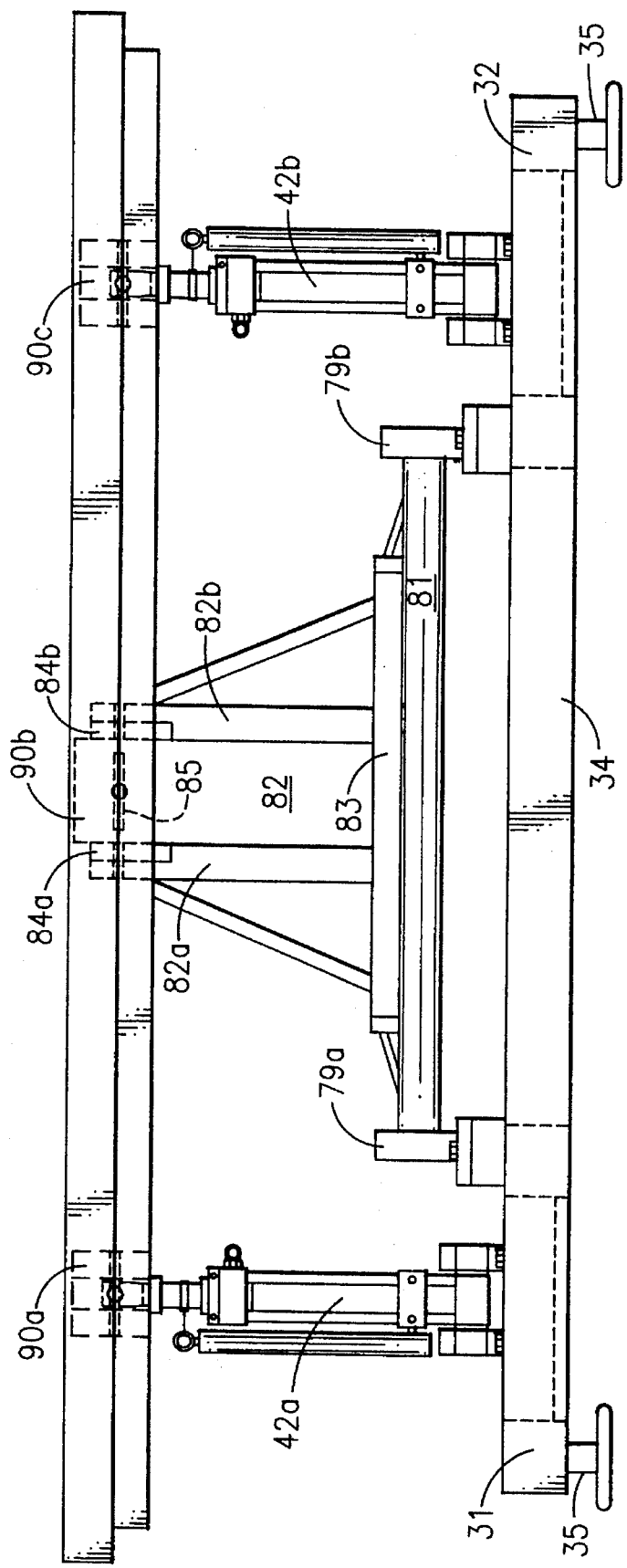
FIG. 3 is a rear elevation view taken at lines 3—3 in FIG. 2.

A rigid generally trapezoidal-shaped rear hinge arm assembly 80 (FIG. 2) includes laterally and horizontally-extending lower and upper frame portions 81 and 82, which are also visible in FIG. 3. Lower frame 81 is fixedly journalled on base frame 30 to be capable of rotating about a fixed laterally-extending axis $Y_5$ of pillow block bearings 79a, 79b on base frame 30, thereby allowing lower frame 81 to swing in an arc about axis $Y_5$. The rigid generally trapezoidal-shaped rear upper arm assembly 82 includes a lower sleeve 83 journalled on axis $Y_6$ at the upper end of lower frame 81. The upper edge of arm 82 terminates in a pair of clevis-like brackets 84a, 84b (FIG. 3) which pivotally support a rear roll-rotation block 90b by means of a laterally-extending pin 85. See FIG. 2c. Block 90 is mounted with its longitudinally-extending centerline above axis $x_b$ of the base frame. Shaft 91b extends laterally and is journalled to the upper rear end of frame 82 at bracket 84a, 84b (FIG. 2c). Two stub shafts 92a, 92b extend longitudinally from opposite ends of block 90b.

Movement of upper frame 50 relative to the base is controlled by the extension and retraction of four double-acting hydraulic cylinders 40, 42a, 42b, and 73. (See FIG. 2). As shown in the front elevation view of FIG. 4, and better in FIG. 3, cylinders 42a and 42b are spaced at opposite lateral sides of the system, and attached at their upper ends by roll rotation blocks 90a and 90c to upper frame 50. These cylinders are located toward the rear end of the base and upper frames, but forward of where they attach to upper frame 50; i.e. they slant upwardly and rearwardly. Potentiometers measure the extension and retraction of those cylinders in well-known fashion, one such potentiometer being shown at 42c in FIG. 4. Cylinder 40 is generally centrally located, as is seen in FIGS. 2 and 5, with the lower end of cylinder 40 pivotally mounted on the base frame by means of a pair of pillow block bearings 77a, 77b carried on a cradle CR, and with the upper end 40a of its rod pivotally fastened into block 70 as shown in FIGS. 2 and 2b. Cradle CR functions similarly to cradle 75 of FIG. 2a. Cylinder 73 located toward the front of the frame as shown in FIG. 2, with the lower end of cylinder 73 pivotally mounted on cradle 75 by a pair of pillow block bearings 76a, 76b. Cradle 75 is mounted on base frame 30 by means of two shafts, 77a, 77b, See FIG. 2a which allow the cradle and cylinder to rotate about a longitudinal axis $X_b$—$X_b$ at the center of base frame 30. Pillow blocks 76a, 76b allow rotation of cylinder 73 about a lateral axis. Hydraulic hose connections for cylinder 73 are shown at 74, 74, and the other cylinders have similar connections, of course.

In operation of the motion system, various of the hydraulic cylinders (40, 42a, 42b, 73) are extended or retracted individually or simultaneously in a variety of combinations, to achieve desired pitching, heave, roll and thrust motions, with the hydraulic flows to and from the hydraulic cylinders controlled by digital computation in accordance with well-known geometric principles. For the system described above in detail, an inexpensive 15 horsepower pump motor drove an inexpensive variable-volume piston-type hydraulic pump at a system pressure of 1250 psig, with a rated flow of 15 gallons per minute. Hydraulic cylinder 40 had a 4 in. diameter and 14 in. stroke, while the three hydraulic cylinders 42a, 42b and 73 each had a diameter of 2.5 in. and a 14-in. stroke.

Whereas particular embodiments of the invention have been described for purpose of illustration, it will be evident to those skilled in the art that numerous variations of the details may be made without departing from the invention as defined in the appended claims.

I claim:

1. Platform motion means for moving, relative to a base(30), a rigid platform (50) adapted to seat a plurality of people facing a projection screen means (11) upon which pictorial matter may be projected for viewing by said people, comprising, in combination: a rigid platform;

front and rear gimbal block means (70, 90b) each having respective longitudinally-extending shaft means attached to from and rear portions, respectively, of said platform (50), for supporting said platform for rotation about a longitudinal axis $X_b$—$X_b$ of said platform, each of said gimbal block means also having a respective laterally extending shaft means (78, 91b);

front hinge means (60) having lower (61) and upper (62) frames, said lower frame of said front hinge means having a first end adapted to be attached to said base to pivot about a fixed first lateral axis ($y_1$) and a second end hinged to a first end of said upper frame to pivot about a second lateral axis ($y_2$), a second end of said upper frame of said from hinge means being attached to said laterally-extending shaft means (78) of said front gimbal block means;

rear hinge means (80) having lower (81) and upper (82) frames, said lower frame of said rear hinge means having a first end adapted to be attached to said base to pivot about a third lateral axis ($y_5$) and a second end hinged to a first end of said upper frame to pivot about a fourth lateral axis ($y_6$), a second end of said upper frame of said rear hinge means being attached to said laterally-extending shaft means (91b) of said rear gimbal block means (90b);

a pair of laterally spaced-apart double-acting hydraulic cylinders (42a, 42b) adapted to be connected between said base (30) and said rear gimbal block means (90a, 90c) to rotate said platform (50) through limited amounts about said longitudinal axis of said platform by differential extension and retraction of said cylinders of said pair, and to lift and lower the rear end of said platform by mutual extension and retraction of said cylinders of said pair;

third and fourth double-acting cylinders each adapted to be pivotally mounted on said base (30) to pivot about a fifth ($y_3$) and sixth ($y_7$) lateral axes, respectively, and connected to said laterally extending shaft means (78) of said front gimbal to lift and lower the front end of said platform (50) and to move said platform in mutually-opposite directions along said longitudinal axis $X_b$—$X_b$ of said platform.

2. Motion means for moving, relative to a base, a rigid platform adapted to seat a plurality of people facing a projection screen means upon which pictorial matter may be projected for viewing by said people, comprising, in combination: a rigid platform;

front and rear mounting means for supporting said platform for rotation about a longitudinal axis of said platform and each having a respective lateral axis associated with said platform;

front hinge means having lower and upper flames, said lower frame of said front hinge means having a first end adapted to be pivotally attached to said base to pivot about a fixed first lateral axis and a second end hinged to a first end of said upper frame to pivot about a second lateral axis, a second end of said upper frame of said front hinge means being attached to said lateral axis of said front mounting means;

rear hinge means having lower and upper flames, said lower frame of said rear hinge means having a first end adapted to be pivotally attached to said base and a second end hinged to a first end of said upper frame to pivot about a fourth lateral axis, a second end of said upper frame of said rear hinge means being attached to said lateral axis of said rear mounting means;

a pair of laterally spaced-apart double-acting hydraulic cylinders adapted to be connected between said base and said read mounting means to rotate said platform about said longitudinal axis of said platform by differential extension and retraction of said cylinders of said pair, and to lift and lower the rear end of said platform by mutual extension and retraction of said cylinders of said pair; and third and fourth double-acting cylinders adapted to be each pivotally mounted on said base to pivot about a fifth axis and a sixth axis, respectively, and connected to said lateral axis of said front mounting means to lift and lower the front end of said platform and to move said platform in mutually-opposite directions along said longitudinal axis of said platform.

* * * * *